AIR CALCINED

NITROGEN CALCINED

AIR CALCINED

NITROGEN CALCINED

United States Patent Office 3,810,830
Patented May 14, 1974

3,810,830
HYDOCRACKING AND HYDRODESULFURIZATION PROCESSES UTILIZING A SALT-CONTAINING NEUTRALIZED SILICA-ALUMINA SUPPORT CALCINED AT DIFFERENT TEMPERATURE RANGES
Jakob van Klinken, Herman Wouter Kouwenhoven, and Pieter Aldert van Weeren, Amsterdam, Netherlands, assignors to Shell Oil Company, New York, N.Y.
Original application Oct. 8, 1969, Ser. No. 864,707, now Patent No. 3,697,444, dated Oct. 10, 1972. Divided and this application June 2, 1972, Ser. No. 259,110
Int. Cl. C10g 13/02, 13/06, 23/02
U.S. Cl. 208—111
14 Claims

ABSTRACT OF THE DISCLOSURE

Residual oils containing asphaltenes, large amounts of sulfur and/or heavy metals are hydrodesulfurized and/or hydrocracked in a process which utilizes a catalyst prepared by first neutralizing a calcined silica-alumina support with a nitrogen base, depositing a hydrogenation metal component on the support by contacting it with an alkaline salt solution of catalytically active metals, then calcining the salt-containing support in an oxygen-containing gas at a temperature in the range of about 185–400° C., and finally calcining in an oxygen-containing gas at a temperature in the range of about 475–650° C. for at least about 1 hour. The oxygen content of the calcining gas and the first calcining time are regulated to avoid sintering the hydrogenation metal component.

RELATED APPLICATION

Figure 1:
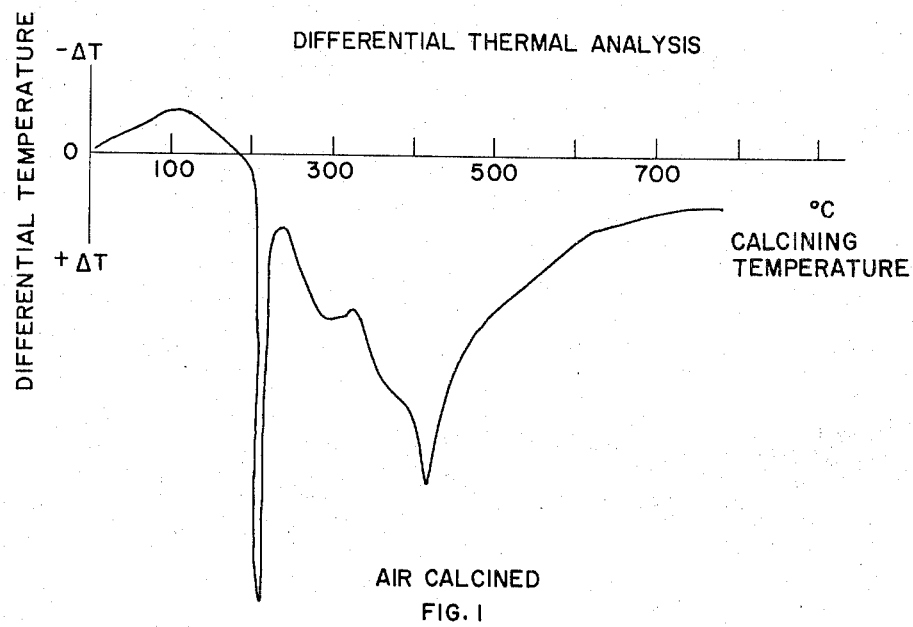

This is a division of application Ser. No. 864,707, filed Oct. 8, 1969, now U.S. Pat. No. 3,697,444, issued Oct. 10, 1972.

BACKGROUND OF THE INVENTION

Field of the invention

The invention relates to a process for the preparation of a porous, slica-alumina based hydrocarbon-conversion catalyst. It also relates to hydrocarbon-conversion processes in whcih these catalysts are applied, in particular to the catalytic desulfurization of hydrocarbon residues.

Discussion of the prior art

In the oil-processing industry a large number of hydrocarbon-conversion processes are applied in which the hydrocarbons or hydrocarbon oils to be converted are contacted with hydrogen in the presence of a catalyst. As a rule, such processes can be grouped under the general heading "catalytic hydrotreating." Catalytic hydrotreating is generally applied for improving the quality of hydrocarbon oil or for converting heavier hydrocarbon oils derived from petroleum into lighter and more desirable petroleum products. These products may be the feedstock for other catalytic conversion processes or may be applied in the petrochemical industry. During catalytic hydrotreating not only a large part of the sulfur and nitrogen originally present in petroleum fractions is removed from the hydrocarbon fraction treated, but at the same time the hydrocarbon feed is wholly or partially cracked and converted into lower-molecular hydrocarbons. Depending on the primary objective, catalytic hydrotreating is called hydrodesulfurization or hydrocracking.

Hydrocracking is the general term for conversion processes in which destructive hydrogenation takes place and in which hydrocarbon feed of relatively high molecular weight are converted into lower-molecular compounds at relatively high temperature and pressure. In such processes sulfur and nitrogen-containing compounds are also converted, with formation of hydrogen sulfide and ammonia, while unsaturated compounds originally present in the petroleum or formed in cracking are converted into saturated compounds.

For the catalytic hydrotreating of petroleum fractions a large number of catalysts have been developed, which specifically, either promote the desulfurization reaction or the hydrocracking reaction. Such catalysts may be based on refractory amorphous carriers consisting of inorganic metal oxides or mixtures of metal oxides, or on crystalline carriers, such as the now frequently applied aluminosilicates or molecular sieves. Such carriers are generally combined with catalytically active metals from Group VI-B and/or Group VIII of the Periodic Table of the Elements in order to impart hydrogenating/dehydrogenating properties to the catalyst.

The catalysts for the above-mentioned catalytic hydrotreating which were known or have been developed have appeared to be suitable only for hydrocarbon fractions which are lighter than the heavier gas oils and the hydrocarbon residues or residual oils. In particular the processing of residues and/or residual oils constitutes a growing problem. Formerly such products were sold as cheap residual fuel, but today they must increasingly be desulfurized as a result of a growing number of regulations concerning air-pollution, in particular with respect to pollution by sulfur-containing products such as sulfur dioxide However, the catalytic desulfurization of such heavier hydrocarbon fractions, in particular of residues, constitutes a technological problem. Besides saturated products, petroleum residues have a high content of polyaromatics, resins and asphaltenes. In addition, such heavy hydrocarbon fractions also contain so-called heavy metals, mainly vanadium and nickel. According to the literature a vacuum residue of a crude petroleum may contain over 500 p.p.m. (parts per million) vanadium and over 100 p.p.m. nickel, as metal. These metals are present in the heavy fraction mainly in a complex form, viz. bound to the asphaltenes. During the catalytic desulfurization or hydrocracking of such asphaltenes-containing residues these compounds deposit on the catalyst and degrade to carbon on the catalyst surface, with simultaneous deposition of the heavy metals. The activity of the catalyst applied is lost fairly rapidly. Restoration of the catalyst activity by simple carbon burn-off, as is common practice in petroleum refining, is not possible on account of the large amounts of interfering metals accumulated on the catalyst surface.

In order to avoid the above difficulties it has been proposed to remove the asphaltenes by means of precipitation from the feed to be desulfurized, prior to catalytic desulfurizing. A drawback of deasphaltenizing is that material which is suitable for conversion into lower-hydrocarbons is removed; consequently, the yield decreases accordingly. On the other hand, no sulfur-free or practically sulfur-free product can be obtained if the precipitated asphaltenes are combined with the deasphaltenized and subsequently catalytically desulfurized oil, because the asphaltenes still contain and/or occlude sulfur compounds. Moreover, a deasphaltenizing process leads to an increase of the cost price of the final, desulfurized product.

As far as is known, a chemical treatment method proposed in the literature for freeing the heavy metal-loaded desulfurization catalyst from these metals has not yet found application. The drawbacks of such a treatment are evident: in the first place it will make the regenerated catalyst very expensive; and in the second place the catalytically active metals which are present on the catalyst, in particular the nickel, will be removed by the treatment.

SUMMARY OF THE INVENTION

One of the objects of the present invention is to provide an active and stable hydrocarbon-conversion catalyst, in particular in catalytic desulfurization and/or hydrocracking of residual oils. In this invention a porous silica-alumina based hydro carbon-conversion catalyst is obtained by first preparing a silica/alumina hydrogel, preferably in the form of a cogel of aluminum hydroxide on silica hydrogel, which is shaped, if desired, and calcined. The xerogel thus obtained is neutralized with a nitrogen base and contacted with an alkaline solution containing salts of catalytically active hydrogenation metals. The impregnated xerogel is then subjected to a controlled calcination whereby temperature is raised stepwise and the required oxygen content is regulated to avoid sintering of the applied metals. Catalysts thus prepared are active and stable in the hydrocracking and desulfurization of residual oils.

DETAILED DESCRIPTION

(A) Hydrogel preparation

A silica/alumina hydrogel can be prepared by any method known in the art, such as: adding a silicate solution to an acidified aluminum salt solution; mixing a silicate solution and a solution of an alkali metal aluminate or an aluminum salt and adjusting the pH of the combined solution to a value of about 5–7 by adding either a base or an acid, depending on the concentrations of the solutions used and on the mixing ratio; or cation exchanging a silicate solution in the acid form and adding an aluminum salt to the silica sol obtained. However, in order to obtain catalysts with highly porous silica/alumina carriers, which are specially suitable for converting asphaltenes-containing hydrocarbon oils or fractions, preferably a hydrogel is prepared which is obtained in the form of a cogel of aluminum hydroxide on silica hydrogel. The term "cogel" will be used for indicating a silica/alumina composition obtained by precipitating aluminum hydroxide on a silica hydrogel. Thus defined, a cogel is not a coprecipitate, since in the preparation of a coprecipitate silicon hydroxide and aluminum hydroxide are precipitated from the solution simultaneously or almost simultaneously. In the preparation of a cogel one does not start directly from a silica sol, either.

According to a preferred embodiment of the process of the invention the hydrogel is obtained as a cogel by precipitating, in an aqueous medium, an aluminum hydroxide gel on a silica hydrogel by adding an aluminum compound and an alkaline-reacting compound to a suspension of a silica hydrogel. For obtaining a silica hydrogel any method known in the art can be applied, such as hydrolysis of esters of orthosilicates with the aid of mineral acids, or hydrolysis of silicon tetrachloride with cold methanol in water. However, preferably alkali metals silicates are applied in the preparation of the silica hydrogel. In a preferred process the silica/alumina is obtained by first precipitating a silica hydrogel from an aqueous, silicate-ions-containing solution, such as water-glass, by adding a mineral acid, subsequently adding an aluminum salt to the solution and then precipitating the aluminum hydroxide gel by adding an alkaline-reacting compound.

As mineral acid any acid may be applied which is capable of precipitating a silica hydrogel from an aqueous, silicate-ions-containing solution. This acid may be applied in the gaseous phase, as, for instance, in the case of hydrogen chloride or carbon dioxide, or as an aqueous solution. In principle, however, the mineral acid will preferably be the same as the anion of the aluminum salt to be added. Thus, when aluminum chloride is applied, preferably hydrochloric acid will be used as mineral acid. Although, of course, this is not strictly necessary. Those skilled in the art can easily add further examples to the one given here.

In the cogel preparation preferably water-soluble aluminum salts, such as aluminum sulfate, nitrate or chloride or mixtures thereof are applied as aluminum compound. Preferably the aluminum salt is first added to the aqueous solution, either in the solid state or as a solution, prior to the addition of the alkaline-reacting compound. Thus, the formation of a homogeneous deposit of aluminum hydroxide gel on the silica hydrogel is promoted.

As alkaline-reacting compound aqueous solutions of alkali metal hydroxides and/or alkaline earth metal hydroxides, such as sodium and potassium hydroxide or calcium hydroxide, may be applied. Besides, suitable solutions of nitrogen bases may be used. It is preferable, however, to apply weakly alkaline solutions, in particular an aqueous ammonia solution. Although the alkaline solution may be added in excess, the addition of the solution will usually be discontinued when no further precipitate is formed.

It is advisable to add the alkaline solution in parts, preferably while stirring thoroughly. Addition in parts has the advantage that the aluminum hydroxide gel is more homogeneously distributed over the silica hydrogel already formed, and locally high concentrations of the gel are avoided. Also, intermediate ageing of the partially formed cogel promotes the further uptake of the aluminum hydroxide gel. If ammonia is applied as alkaline-reacting compound can also be suitably introduced in the gaseous state.

For obtaining good results it is advisable to allow the silica hydrogel to age for a period of time, ranging from 5 minutes to some hours, before continuing the cogel preparation. Ageing may be effected at the temperature which the solution had reached during the silica gel preparation or a slightly elevated temperature. Ageing at temperatures of 20–75° C., preferably of 24–40° C., for 5–1500 minutes has been found to be very suitable. Ageing of the silica hydrogel occurs at a pH of the solution between 4 and 7.

Usually, in the preparation of silica-alumina hydrogel dilute aqueous solutions of silicates and of aluminum compounds are applied. The concentrations of these solutions may vary between wide limits and may, for instance, range from 1 to 35% w. However, preferably these solutions are used in such proportions that in the hydrogel obtained the silica-alumina weight ratio is between 95% silica–5% alumina and 40% silica–60% alumina. More specifically, this ratios is preferably between 90% silica–10% alumina and 70% silica-alumina.

The mineral acids and/or alkaline-reacting compounds to be used are also preferably applied as dilute solutions. Generally, preference is given to acid solutions with a normality of 0.5–10 N; the concentration of the alkaline solution can also vary between these limits.

In the hydrogel preparation special preference is given to aluminum nitrate as the aluminum compound and to nitric acid as the mineral acid, because in the subsequent calcination, in which the hydrogel changes into the xerogel, no impurities originating from the anion will remain in the xerogel.

After the formation of the hydrogel the precipitate formed is separated from the liquid, for instance by means of filtration, decantation or otherwise. The precipitate separated is washed a few times with either ion--free water or a highly dilute solution of acid or ammonia, and subsequently dried. Washing is preferably continued until no more alkali can be detected in the wash water. The alkali metal or alkali earth metal content of the washed precipitate has then been reduced to below 0.5% w. Usually the cogel can more easily be freed from alkali by washing than the coprecipitate. When the coprecipitate is washed until the wash water is alkali-free, the alkali content of this gel will generally be lower than 0.3, whereas in the same case the alkali content of the cogel will be lower than 0.01% w. Drying is effected at a temperature of at least 100° C. Subsequently the hydrogel is calcined, preferably at a temperature in the range of from 450 to 600° C. for 1 to 16 hours. Good results were obtained by calcining at 500° C. for at most 3 hours.

The catalyst preparation according to the process of the invention is especially of importance when shaped catalyst particles are desired. Most, if not all, commercial catalyst applications call for a certain shape and size of the catalyst particles. For this reason, after the preparation of the hydrogel this gel is usually formed into shaped particles, such as extrudates, globules, pills, tablets, granules or the like, prior to calcination. The techniques applied for this purpose, such as spray-drying, casting, drying in rotary drums, etc., are generally known. The proposed neutralization step according to the invention in particular has a favorable effect on the catalytic properties of the final catalyst if shaping takes place after the hydrogel has been obtained, but before the application of the catalytically active metals.

Before the hydrogel is formed into shaped particles it may, if desired, first be dried until it has a water content of about 70–90%. Such a water content especially facilitates shaping by means of extrusion and improves the mechanical properties of the final particles. The hydrogel may be dried to the air or at a slightly elevated temperature in, for instance, a drying drum. After shaping, the shaped particles are dried further at temperatures in the range of from 100 to 200° C. and finally calcined as indicated.

Instead of a cogel obtained according to the process described in the foregoing, a commercial cracking catalyst with a low alumina content can be applied as cogel. Such cracking catalysts usually have an alumina content of about 13.6% w. and are also obtained as a cogel.

(B) Neutralization

After calcining, the xerogel obtained from the hydrogel is neutralized with a nitrogen base. For this purpose the xerogel is preferably first taken up in an aqueous solution of a salt of a nitrogen base. The nitrogen base to be applied for the neutralization need not necessarily be the same as that from which the salt is derived, but preferably these nitrogen bases are the same. Suitable nitrogen bases—or salts derived therefrom—are ammonia, hydroxylamine, hydrazine, guanidine, the lower mono- or polysubstituted N-alkyl- and alkanolamines, such as methylamine, diethylamine, monoethanolamine, triethanolamine, tetraalkylammonium hydroxide, pyridine or piperidine. Preference is given to the application of ammonia as the nitrogen base. Although, in principle, the salts derived from any acid can be applied, again those salts are preferred which are derived from acids which, in the subsequent calcining of the xerogel, leave no residue. In view of this consideration, in particular the salts of nitrogen bases derived from acids such as nitric acid and the lower mono- or polybasic carboxylic acids, such as formic acid, acetic acid, oxalic acid, citric acid and the like, are eligible. Preference is given to the ammonium and tetraalkylammonium salts of the acids mentioned.

With respect to the organic compounds the term "lower" is used in this application to indicate those organic compounds which, in all, have at most 10 carbon atoms in their molecule.

The addition of the nitrogen base used for the neutralization is continued until the solution in which the xerogel has been taken up has a constant pH. Preferably the neutralization is carried out in such a way that this solution maintains a constant pH between 6.0 and 8.5 for at least 30 minutes. Since the solution in which the xerogel has been taken up has to be allowed to stand for some time before it can be ascertained whether the pH has remained constant, the neutralization will have to be carried out batchwise. Usually the neutralization will be regarded as completed when the pH of the liquid remains at the value of 7 for one hour.

The concentration of the solution of the nitrogen-base salt may vary within wide limits. Good results have been obtained with salt solutions with a molar concentration of 0.05 to 5, calculated on the nitrogen base.

After the neutralization the xerogel is separated from the salt solution, washed with ion-free water, and dried. Drying is preferably effected at elevated temperatures.

(C) Application of metals

To the xerogel thus treated one or more catalytically active metals are applied by one of the methods usually employed for this purpose. Although any technique may be applied, preference is given to impregnation. Impregnation may be effected by the usual methods. Catalytically active metals which are specially suited to the purpose envisaged, are the metals belonging to Groups V–B, VI–B, VII–B and VIII of the Periodic Table of the Elements, such as vanadium, molybdenum and tungsten, rhenium, the metals of the iron group and those of the platinum group. These metals are used separately or in combination with each other. Frequently applied combinations are those of tungsten and/or molybdenum with cobalt and/or nickel. With respect to the conversion processes aimed at, very good results are obtained in particular by applying the metals nickel and molybdenum as the catalytically active metal components.

The metals of the platinum group are generally applied in a quantity of 0.01 to 5 parts by weight of metal per 100 parts by weight of xerogel. The other metals may be applied in a quantity of 1 to 35 parts by weight of metal per 100 parts by weight of xerogel. Usually the total amount of catalytically active metal does not exceed 35 parts by weight. In the case of combinations of metals of Group VI–B with metals of the iron group (Group VIII) the Group VI–B metals are preferably applied in an amount of 5 to 30 parts by weight and the iron-group metals in an amount of 1 to 10 parts by weight.

Very active catalysts are obtained when the Group VIII and Group VI–B metals are applied in an atomic ratio between 0.1 and 1.0. Preferably these metals are applied to the xerogel in a quantity of at least 100 milligram-atoms of total metal load per 100 grams of carrier.

In a preferred embodiment of the invention the metals tungsten and/or molybdenum are applied to the neutralized xerogel with the aid of an alkaline-reacting impregnating solution. Preferably this solution has a pH of at least 9, more specifically of from 10 to 13. This alkaline solution may be an ammoniacal solution or an aqueous solution of an organic nitrogen base, such as a lower alkylamine or alkanolamine, hydroxylamine, hydrazine or guanidine. Special preference is given to the application of the lower alkanolamines, such as mono-, di- and triethanolamine.

If both tungsten and/or molybdenum and a metal of the iron group are applied as catalytically active metal components, the application of an alkaline solution, in particular and aqueous alkanolamine solution, has the advantage that it permits these metals to be applied to the xerogel simultaneously by means of one solution.

The metals mentioned are preferably applied in the form of compounds which in the subsequent calcining leave no contaminating residue on or in the catalyst other than the metal or metal oxide concerned. Therefore preference is given to salts of lower mono- or polybasic carboxylic acids, in particular those with fewer than 8 carbon atoms, such as formic acid, acetic acid, oxalic acid, citric acid and the like. The corresponding amine complexes may also be applied. Those metals which may occur both as a cation and an anion are preferably applied as their acids, such as tungstic acid or molybdic acid or the ammonium salts thereof, such as ammonium paratungstate or ammonium molybdate.

(D) Controlled calcination

Although for the purpose in view the metals could also be applied in the form of nitrates, the use of the latter group of compounds is not recommended because of the heat liberated during the calcination of the xerogel, as will be explained below.

After one or more catalytically active metals have been applied to the neutralized xerogel, the xerogol is calcined again. It has been found that this final calcining step has a greater influence on the properties of the final catalyst. During the calcining the ammonium hydroxide and/or other nitrogen bases present in or on the cogel will burn, consuming the oxygen needed for the calcining and developing a considerable amount of heat. Also the organic anion which may have been used in applying the metals will contribute to the heat development. This liberated heat may cause local overheating, which has an adverse effect on the final catalyst as regards structure and catalytic activity. The heat liberated in the catalyst may cause sintering of the applied metals, as a result of which the catalytically active material will be less finely and homogeneously distributed over the catalyst surface. In order to control these exothermic oxidation reactions the xerogel mentioned is preferably subjected to a controlled calcination in which the temperature is increased stepwise and in which the oxygen content required for the calcination is regulated in dependence on the catalyst temperature.

The above heat effect also occurs when ammonium hydroxide has been used for neutralizing the xerogel and no further organic compounds have been applied to or introduced into the xerogel during the application of the catalytically active metals. Under the influence of the catalyst the ammonia liberated during calcination oxidizes to form nitrogen and water. This reaction is highly exothermic; the amount of heat liberated is 75 Kcal./gram-molecule of ammonia.

The heat effects occurring in the calcination of the xerogel can be demonstrated with the aid of differential thermal analysis (DTA). In FIGS. 1–4 the graphs are represented which have been obtained by this method during the calcination of two samples of catalysts prepared according to the invention. In all cases the reference compound is $\alpha$-$Al_2O_3$.

FIG. 1 is a DTA record obtained by calcining neutralized silica-alumina xerogel impregnated with nickel and molybdenum in air by means of an ethanolamine solution. The nickel salt used was nickel nitrate.

Figure 2:
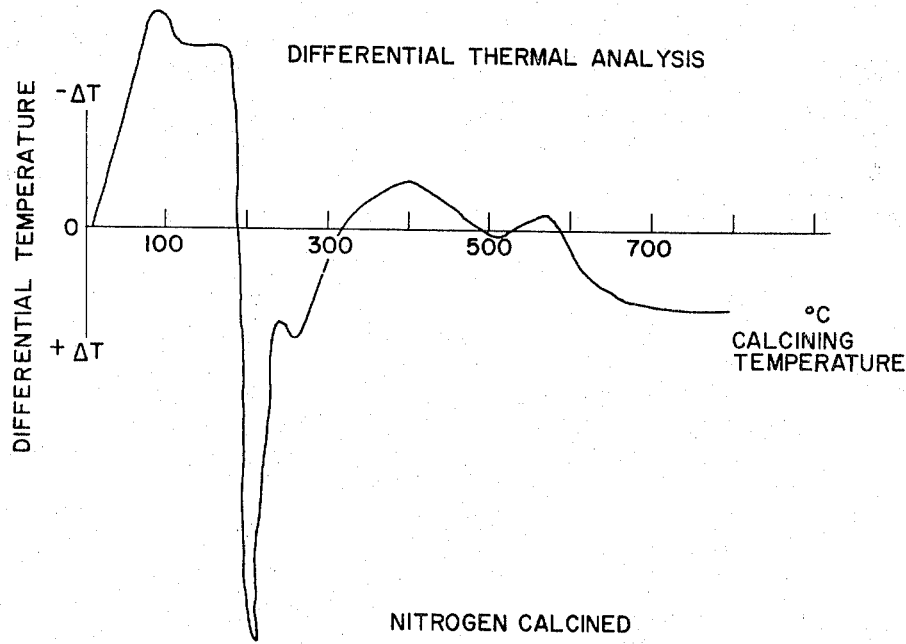

FIG. 2 has been obtained by heating the same xerogel in nitrogen.

Figure 3:
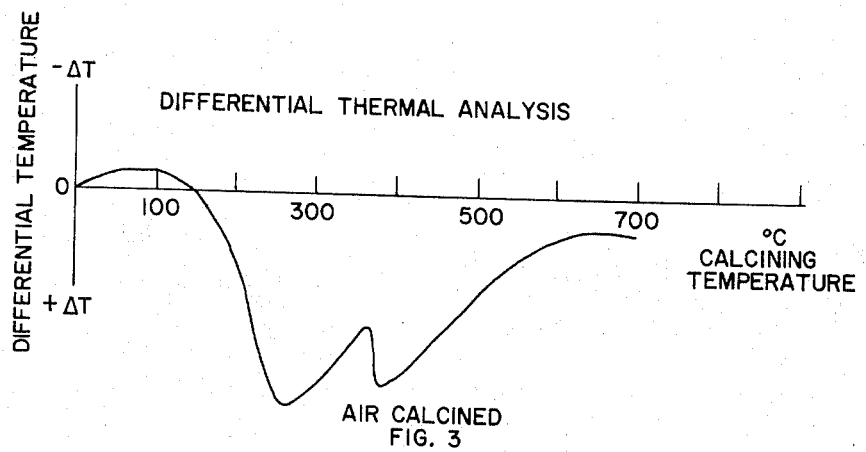

FIG. 3 has been obtained by calcination of a nickel-molybdenum-containing, neutralized silica-alumina xerogel which has been prepared in the same way as the xerogel of FIG. 1, with the exception that nickel formate was the nickel salt used.

Figure 4:
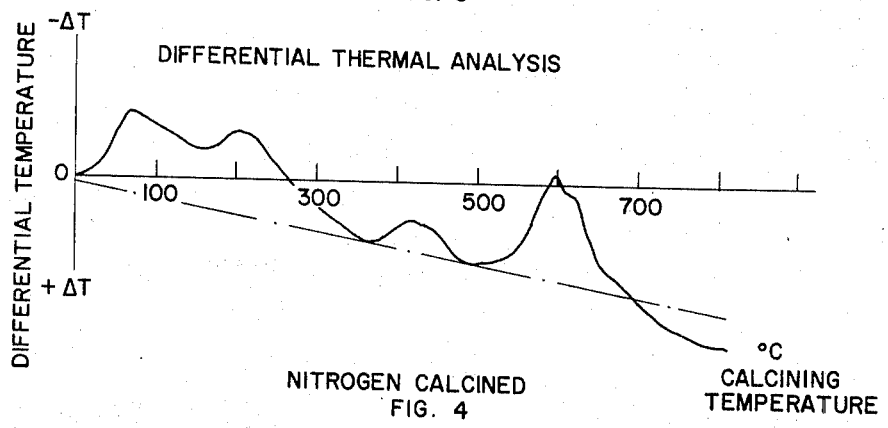

FIG. 4 has been obtained by heating the xerogel of FIG. 3 in nitrogen.

FIGS. 1 and 2 clearly show the strong heat effect which occurs when nitrates are used in applying the catalytically active metals, and show that it is independent of the calcining medium. Therefore, it is preferably to apply the catalytically active metals in the form of salts derived from acids other than nitric acid or nitrous acid. The application of, for instance, nickel formate as the nickel salt leads to a more active and more stable catalyst.

From FIGS. 3 and 4 it follows that exothermic heat effects of a silica-alumina impregnated with nickel formate can be kept well under control during calcining by regulating the calcination medium.

The graphs discussed above show the importance of accurate control of calcining temperature. For this reason the neutralized, metal-loaded xerogel is preferably calcined at at least two different calcination temperatures, the first calcination temperature being in the range of from 185 to 400° C., and the final calcination temperature being in the range of from 475 to 650° C., care being taken by regulating the amount of oxygen that, at the first and each subsequent calcination temperature, the temperature of the xerogel to be calcined is very little higher than the maximum permissible final calcination temperature. The material to be calcined is gradually heated to the first calcination temperature, which is the temperature at which the first heat effect occurs.

The magnitude of the heat effect is controlled by regulating the oxygen supply needed for the calcination. During the calcination the temperature of the batch to be calcined is measured at regular intervals, and, as soon as the temperature tends to increase excessively, the oxygen supply per unit time is reduced and/or the flow of the oxygen needed for the calcination is increased. The latter may be effected in two ways. Either the flow rate of the oxygen-containing gas itself is kept constant and a second, inert, gas, such as nitrogen or a rare gas, is passed through at a high or relatively high velocity, as a result of which the oxygen content decreases and the material is cooled externally, or, in certain cases, the flow rate of the oxygen-containing gas itself is increased. Although the latter measure will, in the first instance, lead to an increase of the oxygen supply per unit time, the higher rate of flow will have a cooling effect on the material to be calcined.

Generally, it will be tried to keep the amount of heat removed during the calcination equal or practically equal to the amount of heat generated, by regulating the oxygen supply and/or increasing the oxygen flow.

When the temperature of the material to be calcined has become equal to the first calcination temperature, and, on further increasing the oxygen content, no further heat effects occur, the temperature is increased to the second calcination temperature, i.e. the temperature at which the next heat effect occurs. Thus, in a number of consecutive steps the material to be calcined is brought to the final calcination temperature, at which the metal compounds applied to the xerogel decompose and the metals are converted into their respective oxides.

As appears from the foregoing, the various calcination temperatures can be simply determined by those skilled in the art, for instance, by differential thermal analysis or by means of the thermogravimetric balance. The time during which the material to be calcined has to be kept at the first and each subsequent calcination temperature depends on a variety of factors, such as magnitude of the heat effect, size of the batch to be calcined, layer thickness applied in the calcination, and the like. The time of the final calcination temperature is preferably from 1 to 5 hours.

Usually the application of two calcination temperatures will suffice, in which case the second will also be the final calcination temperature. In this case preferably a first calcination temperature between 270 and 370° C. is applied and a second calcination temperature between 490 and 600° C. In a preferred embodiment of the controlled calcination process the material to be calcined is first heated under a blanket of nitrogen or another inert gas to a temperature which is 25 to 100° C. below the first calcination temperature, after which an increasing amount of oxygen is added to the inert gas, the temperature being gradually increased further. When the first calcination temperature has been reached, and, on the oxygen content being further increased, the heat effect starts, care is taken—by regulating the oxygen content as described above—that the temperature of the material to be calcined does not exceed 680° C.; preferably the latter temperature is below 600° C. The oxygen content applied usually is in the range of from 0.5 to 2.5% w. When the heat effect has passed, at the first calcination temperature the oxygen-containing inert gas is gradually replaced by oxygen or by a gas mixture rich in oxygen, such as air, and subsequently the temperature is increased to the second and final calcination temperature at which the xerogel is calcined for 1–5 hours.

The catalysts obtained according to the process of the invention are very porous; at least 50% of the pore volume is accounted for by pores with a diameter exceeding 75 A. They have a high initial activity, in particular in the hydrodesulfurization of heavy feeds. This initial activity $k_0$, expressed in liters of feed per liter of catalyst per hour, is retained for a long time, in contrast with that of other, already proposed catalysts, and hence the catalysts according to the invention are very stable. The catalyst stability follows from the constant for the decrease in activity, expressed as $-d(\ln k)/dt$, which, in contrast with that of the catalysts already proposed, is very small.

(E) Conversion feedstocks

Although the catalysts according to the invention can be applied for the conversion of hydrocarbons and hydrocarbon oils in general, they are more specifically suited to the conversion of heavier petroleum fractions such as hydrocarbon oils with a boiling range which substantially lies above 350° C. The catalysts mentioned are particularly suitable for the conversion of such oils which contain asphaltenes, a large amount of sulfur and/or a large amount of heavy metals such as nickel, vanadium and iron. Examples of such oils are crude petroleum itself or topped crude petroleum, long or short residues, that is to say, the bottom products obtained in, respectively, atmospheric or vacuum distillation of crude petroleum (flashing), vacuum distillates, bottom products obtained in thermal cracking (visbreaking) of crude oils, cat-cracked cycle oils and also the so-called black oil and crude oils originating from shale, tar sand and the like. If desired, the heavier oils or petroleum fractions mentioned can first be deasphalt(en)ized, but this is certainly not necessary. In particular, the catalysts according to the invention are suitable for the hydrocracking and/or hydrodesulfurization of such hydrocarbon oils. Furthermore these catalysts can be suitably applied for the hydrocracking of such heavier oils for the preparation of lubricating oils. Specially eligible as the feed for such a conversion process are mixtures of flashed distillates and deasphalted residual oils.

(F) Process conditions

The catalytic hydrotreatment in which the catalysts according to the invention are applied is effected at elevated temperature and pressure. Suitable temperatures are in the range of from 300 to 500° C., and suitable pressures in the range of from 35 to 350 kg./cm.$^2$ abs. The hydrodesulfurization of heavier petroleum fractions which contain asphaltenes besides a large amount of heavy metals (asphaltenes content >2% w., heavy metals content >25 p.p.m.w. in all, sulfur content >1.5% w.) is preferably effected under hydrocracking conditions. Suitable conditions are a temperature in the range of from 350 to 475° C. and a pressure of 100 to 250 kg./cm.$^2$ abs. Preferably pressure and temperature are chosen such that at least 40% and preferably 70 to 85% of the sulfur present in the feed is removed.

The space velocity of the feed varies from 0.2 to 10 parts by volume of hydrocarbon oil per volume of catalyst per hour; the hydrogen gas needed for the conversion is supplied at a gas rate in the range of from 150 to 5000 Nl. hydrogen per kg. feed.

The catalyst hydrotreatment is preferably carried out by using a fluidized or moving catalyst bed in order to prevent the catalyst bed from becoming clogged, for instance as a result of the presence in the heavier oils of bituminous components such as asphaltenes. Various types of fluidized or moving bed may be applied, with or without liquid and/or gas recycling of the suspended catalyst.

The catalyst obtained according to the invention can be applied in one-stage processes or as catalyst for the first stage of a two-stage or multi-stage process. It is applied in the sulfided form and is therefore first sulfided in the usual way. The invention will be elucidated further with the aid of the following examples.

EXAMPLE I

In this example the preparation of the catalyst according to the invention, which is effected in four steps, is described in more detail.

(a) Preparation of the silica-alumina cogel 2628 g. water-glass (silica content 26.5% w.) was made up with distilled water to 11,600 g., and the solution obtained was heated to 40° C. To the solution, which had a pH of 11, 6 N HNO$_3$ was slowly added until the pH was exactly 6.0. In 30 minutes 1045 ml. acid was added. The silica hydrogel formed was aged for 24 hours at 40° C., with stirring. To the suspension of the aged silica gel in 5 minutes 764 g. Al(NO$_3$)$_2$·9H$_2$O, dissolved in water and made up to 1224 g. was added while stirring. The pH of the resulting liquid was 2.8. The silica gel suspension was stirred for 10 minutes and subsequently the pH was raised to 4.8 by means of a 25% solution of ammonia. After 10 minutes stirring the pH was raised once more, namely to 5.5, by further addition of ammonia. The obtained hydrogel of aluminum hydroxide on silicon hydroxide was washed with distilled water until the filtrate was free from sodium ions (which was checked with the aid of magnesium uranyl acetate). The cogel then contained less than 0.01% w. sodium which cannot be removed by washing. The washed cogel was dried to the air (to a water content of 80%) and subsequently extruded into 1.5 mm. extrudates, which were dried at 120° C. and then calcined at 500° C. for 3 hours.

(b) Neutralization of the xerogel

Of the calcined cogel, which had a silica-alumina weight ratio of 87% w. SiO$_2$:13% w. Al$_2$O$_3$, 412 g. was suspended in 4120 ml. of a molar NH$_4$NO$_3$ solution. The pH of the suspension was 4.5. By means of a concentrated ammonia solution (25%) the pH was raised to 7 and was maintained at this value by adding some ammonia from time to time until the pH remained constant for 60 minutes (in all, about 25 ml. was added). The cogel thus treated was filtered off, washed with distilled water, and dried at 100° C.

(c) Application of the metal

Of the neutralized SiO$_2$/Al$_2$O$_3$ xerogel 421 g. (394 g. dry matter) was impregnated with a solution containing nickel and molybdenum. This impregnating solution had been obtained by dissolving 116 g. ammonium heptamolybdate (54.3% Mo) and 25 g. nickel formate dihydrate separately in some water and subsequently combining the two solutions, while adding such an amount of monoethanolamine that the initially formed precipitate dissolved again. The total volume of the impregnating solution, which had a pH of 10.3, was 400 ml. Fifteen minutes after impregnation the xerogel was dried at 120° C.

(d) Calcination

After impregnation the xerogel was calcined by means of controlled calcination. For this purpose the extrudates were slowly heated to 275° C. in a tubular oven equipped with a movable thermocouple, nitrogen being passed through at the rate of 40 l./h. Subsequently the temperature of the oven was gradually increased to 350° C., oxygen being added to the nitrogen flow at such a rate that at 300° C. the oxygen content was ½% v., at 325° C. 1% v., and at 350° C. 2% v. The temperature of the tubular oven was then maintained at 350° C., the oxygen content being increased to about 5% until it was observed by means of the thermocouple that the catalyst "started" and the oxidation of ammonia and other (organic) compounds commenced. By regulating the oxygen content, which was reduced to 2% v.—and sometimes to a value below 2% v., it was ensured that the catalyst was burned off completely without allowing the temperature of the catalyst to exceed 550° C. After the heat front had passed the whole catalyst bed the nitrogen flow was gradually replaced by an air flow (40 l./h.). During the change-over to air, the catalyst temperature was carefully controlled, however, after the nitrogen flow had been replaced completely, the temperature of the tubular oven was increased to 500° C. and maintained at this value for 3 hours.

The final catalyst (catalyst C) contained 2 parts by weight of nickel and 16 parts by weight of molybdenum per 100 parts by weight of carrier. Its specific surface area was 292 m.²/g. and its pore volume 0.71 ml./g.

EXAMPLE II

The activity of catalyst C obtained as described in Example I, with respect to its desulfurizing and hydrogenating functions, was determined in separate laboratory tests. As the feeds to be desulfurized thiophene-containing toluene was used, and as the feed to be hydrogenated benzene was applied. The activity of the catalyst was compared with that of two other experimental catalysts of the same composition as catalyst C, except that one of these two catalysts (catalyst A) was obtained by directly impregnating the xerogel prepared according to Example I(a), omitting the neutralizing step (b) and using an aqueous solution of a nickel compound and a molybdenum compound, without using monoethanolamine; the other (catalyst B) was obtained according to Example I, omitting the neutralization step (b), but using monoethanolamine. The results obtained, together with the conditions applied in the desulfurization and hydrogenation, are given in Table 1. The space velocity required to achieve a given level of desulfurization or hydrogenation at constant operating conditions is used as a measure of activity, $k_0$.

TABLE 1

Catalyst carrier: $SiO_2$-$Al_2O_3$ cogel (13% w. $Al_2O_3$)
Composition: 2.0 p.b.w. Ni and 16.0 p.b.w. Mo per 100 p.b.w. xero(co)gel

| Feed | Toluene plus 7.1 w. thiophene | Benzene plus 1% w. sulfur as $CS_2$ |
|---|---|---|
| Operating conditions: | | |
| Temperature, °C. | 225 | 400 |
| Pressure, kg./cm² | 35 | 47 |
| $H_2$/feed, molar ratio | 9/1 | 35/1 |

| Catalyst | Desulfurization activity, $k_0$ ml.ml.⁻¹.h.⁻¹ | Hydrogenation activity, $k_0$ ml.ml.⁻¹.h.⁻¹ |
|---|---|---|
| A | 0.38 | 0.24 |
| B | 0.75 | 0.59 |
| C | 0.83 | 0.79 |

The activities show that both the application of an aqueous monoethanolamine solution in applying the hydrogenating/dehydrogenating metals and the application of a neutralization treatment significantly improve the catalyst activity.

EXAMPLE III

In a model experiment the optimum load of the catalyst and the optimum atomic ratio of Ni-Mo and of Ni-W were determined. For this purpose, with the aid of a commercial silica-alumina (13% $Al_2O_3$) a series of catalysts was prepared by means of impregnation with an aqueous monoethanolamine solution. After calcination at 500° C. for 3 hours and sulfiding, the catalysts were tested for desulfurization activity for thiophene, as described in Example II. The results are given in Table 2.

TABLE 2

| Number | Applied metals | Atomic ratio Group VIII/ Group VI B metal | Load in parts by weight per 100 p.b.w. of carrier* | Desulfurization activity for thiophene, ml.ml.⁻¹.h.⁻¹ |
|---|---|---|---|---|
| 1 | Ni/Mo | 0.25 | 1.2 Ni/7.7 Mo | 0.44 |
| 2 | Ni/Mo | 0.25 | 2.4 Ni/15.4 Mo | 0.70 |
| 3 | Ni/Mo | 1.00 | 2.95 Ni/4.8 Mo | 0.35 |
| 4 | Ni/Mo | 1.00 | 5.9 Ni/9.6 Mo | 0.55 |
| 5 | Ni/W | 0.25 | 1.2 Ni/14.7 W | 0.23 |
| 6 | Ni/W | 0.25 | 2.4 Ni/29.4 W | 0.44 |

*Total load: 100 mg./at (Nos. 1, 3 and 5) or 200 mg./at (Nos. 2, 4 and 6) of Group VIII plus Group VI-B metal per 100 g. of carrier.

The above results show that preference should be given to a Ni/Mo-containing catalyst with an atomic ratio of 0.25 and a total load of 200 milligram-atoms of metal per 100 grams of carrier.

EXAMPLE IV

This example was included to show the improved stability of a catalyst prepared by the method of the invention. Several catalysts were compared for desulfurizing a long residue obtained from a Middle East crude. The sulfur content of the residue was 4.1% w. Catalysts 1 and 2 were obtained by impregnating an experimental alumina with a very large average pore diameter with a solution in aqueous ethanolamine of, respectively, a nickel and a tungsten compound (catalyst 1), and a cobalt and a molybdenum compound (catalyst 2). Catalyst 3 is a commerical catalyst based on zeolite Y. Catalyst 4 is an experimental catalyst obtained by treating a zeolite Y with an ammonium salt solution until its sodium content is lower than 0.5/ w. $Na_2O$, and subsequently impregnating it with an aqueous monoethanolamine solution of a nickel and a tungsten compound. Catalysts 5 and 6 are fluorided hydrocracking catalysts with a high fluorine content; catalyst 5 is a commercial catalyst. Catalyst 7 is a commercially available desulfurization catalyst. Catalysts 8 and 9 were obtained by the process of the invention. Catalyst 9 is the catalyst according to Example I; catalyst 8 was obtained in the same way, with the exception of the nickel compound used in the impregnation, which was nickel nitrate in this case. The results obtained and the desulfurization conditions applied are given in Table 3.

TABLE 3

| Catalyst (composition in parts by weight) | Average pore diameter | Conditions—LHSV: 2 1.1⁻¹·h.⁻¹; H₂ gasrate: 500 N 1, H₂ per 1 feed | | Initial activity | | Constant for activity decrease −d(ln k), dt 10³ h.⁻¹ over 100 h.) | Composition of the liquid product, percent w. on feed | | | |
|---|---|---|---|---|---|---|---|---|---|---|
| | | Pressure, kg./cm.² | Temp., °C. | desulfurization, percent w. | $k_o$, 1.1⁻¹·h⁻¹ | | Fraction, <375° C. | Fraction, >375° C. | | |
| | | | | | | | | Asphaltenes plus maltenes | Aromatics | Saturates |
| 1...... Ni/W/Al₂O₃ (2.4/29.4/100). | 180 | 200 | 400 | 71 | 1.2 | 2.8 | 17.9 | 16.9 | 36.9 | 28.3 |
| 2...... Co/Mo/Al₂O₃ (2.6/6.0/100). | 170 | 200 | 400 | 71 | 1.2 | 4.9 | 16.5 | 16.5 | 36.9 | 30.1 |
| 3...... Pd/zeolite Y ᵃ (0.5/100). | 8 | 75 | 420 | 8 | | | 19.4 | 25.1 | 35.5 | 20.1 |
| 4...... W/Ni/zeolite Y ᵇ (3/3/100). | 8 | 150 | 400 | 15 | | | 14.5 | 25.0 | 36.9 | 23.5 |
| 5...... W/Ni/F/SiO₂-Al₂O₃ (26/13/4/100). | 60 | 150 | 420 | 69 | 1.1 | 4.1 | 16.7 | | | |
| 6...... W/Ni/F/Al₂O₃ (8.8/1.4/8/100). | 90 | 150 | 420 | 71 | 1.2 | 4.8 | 19.2 | | | |
| 7...... Co/Mo/Al₂O₃ (4.1/10.3/100). | 80 | 150 | 400 | 82 | 2.2 | 4.0 | 13.7 | 16.3 | 38.5 | 31.5 |
| 8...... Ni/Mo/SiO₂-Al₂O₃ cogel ᶜ (2/16/100). | 90 | 150 | 400 | 75 | 1.5 | 2.3 | 12.8 | 16.5 | 39.9 | 30.8 |
| 9...... Ni/Mo/SiO₂-Al₂O₃ cogel (2/16/100). | 90 | 150 | 410 | 80 | 2.0 | <0.5 | 19.7 | 15.7 | 33.6 | 30.9 |
| Feed | | | | | | | 11.9 | 28.0 | 38.7 | 21.4 |

ᵃ Contains 2.0% w. Na₂O.
ᵇ Contains 0.3% w. Na₂O.
ᶜ Nickel applied as Ni(NO₃)₂ instead of as nickel formate.

The data of this table show that the commercial catalyst 7 has the highest initial activity, but the stability of this catalyst is much lower than that of the silica/alumina-cogel-based catalyst according to the invention, as appears from the constant for the activity decrease over the first hundred run hours, which is 4.0 to 2.3/<0.5, respectively. The special influence of the application of nickel formate on the activity and stability of the catalysts becomes evident when the data for catalysts 8 and 9 are compared.

EXAMPLE V

The hydrocracking activity of the catalyst of Example I was compared with that of two commercially available catalysts in the one-stage hydrocracking of a deasphalted long residue.

The feed had been obtained in the following way. A long residue from a Middle East crude oil was flashed at 390° C. and 60 mm. Hg. The distillate obtained contained 2.8% w. sulfur (S) and no vanadium (V). The remaining short residue, which contained 5.4% S and 100 p.p.m.w. V, was deasphalted in two stages. For this purpose it was treated with pentane at 30° C. at the ratio of 5 parts by volume of pentane per volume of short residue. The precipitated C₅-asphaltenes were separated and the extract was heated to 185° C. at a pressure of 30 atm.

An oil which, under these conditions, was not soluble in pentane separated; this oil was removed. After the pressure had been decreased, the pentane was removed from the extract by distillation, and a deasphalted residual oil was obtained which contained 4.4% w. S and 28 p.p.m.w. V. The whole of the latter oil was mixed with the earlier obtained flashed distillate. Thus, a desaphalted long residue containing 3.5% w. S. and 11 p.p.m.w. was obtained in a yield of 80% on the orginal long residue.

The deasphalted long residue was cracked at a temperature of 400° C. and a pressure of 100 kg./cm.². The space velocity applied was 0.5 liter of feed per liter of catalyst per hour, and the hydrogen/feed ratio was 2000 Nl. per liter of feed.

One of the above-mentioned two commercially available catalysts had a silica-alumina carrier and tungsten and nickel as the active metal components, its composition being: 8 parts by weight of Ni and 26 parts by weight of W per 100 parts by weight of carrier (79% SiO₂-21% Al₂O₃), and the other had an alumina carrier and molybdenum and nickel as the active metal components, its composition being: 3.1 parts by weight of Ni and 11.7 parts by weight of Mo per 100 parts by weight of Al₂O₃.

The hydrocracking products were fractionated, and some of the properties were determined. The results are given in Table 4.

TABLE 4

| Catalyst | Commercial W/Ni on SiO₂-Al₂O₃ (26/8/100) | Commercial Mo/Ni on Al₂O₃ (11.7/3.1/100) | Catalyst C Mo/Ni on SiO₂-Al₂O₃ (Example I) (16/2/100) |
|---|---|---|---|
| Composition of liquid product, percent w.: | | | |
| Fraction <80° C | | 1.4 | |
| Fraction 80-180° C | 7.6 | 4.3 | 11.9 |
| Fraction 180-250° C | 7.3 | 5.3 | 11.3 |
| Fraction 250-375° C | 31.4 | 30.0 | 36.7 |
| Fraction >375° C | 53.7 | 50.0 | 40.1 |
| Properties: | | | |
| Fraction 80-180° C.: | | | |
| Aromatics, percent w | | 26.3 | 20.8 |
| Fraction 180-250° C.: | | | |
| Aromatics, percent v | 37.5 | 36.5 | 28.8 |
| Smoke point, mm | 13.2 | 13.2 | 15.5 |
| Fraction 250-375° C.: | | | |
| Cloud point, °C | −1 | 0 | −6 |
| Diesel index | 47 | 48 | 57 |

The catalyst according to the invention is very suitable for converting heavy feed into naphtha and middle distillates with a high conversion. The above results show that hardly any light products (fraction <80° C.) are formed, and that the gas oil obtained (fraction 250-375° C.) has a high diesel index. The fraction >375° C. can be used for luboil manufacture, and also the remaining fractions can be used as feed for other conversion processes.

EXAMPLE VI

A long residue of a crude oil originating from the Middle East was hydrodesulfurized with the aid of the catalyst obtained according to Example I, under different conditions as regards space velocity and temperature. The catalyst was used in the form of 1.5 mm. extrudates; it had previously been sulfided by means of a mixture of hydrogen and hydrogen sulfide, using a cold-start-up procedure. The highest temperature applied in sulfiding was 450° C.

The pressure used in the various experiments was 150 kg./cm.² and the hydrogen gas rate was 500 Nl. per kg. feed. The results obtained and the analytical data of the total liquid product are given in Table 5.

TABLE 5

| Conditions: | | | |
|---|---|---|---|
| Space velocity, l.l⁻¹.h.⁻¹ | 0.75 | 0.75 | 1.0 |
| Temperature, °C | 390 | 400 | 400 |
| | Feed | Product | Product | Product |
|---|---|---|---|---|
| Composition, percent w.: | | | | |
| Fraction <375° C | 12.3 | 24.4 | 34.1 | 30.1 |
| Asphaltenes | 4.2 | 2.6 | 2.4 | 2.2 |
| Resins | 22.5 | 14.5 | 10.3 | 11.2 |
| Aromatics | 38.2 | 28.8 | 23.0 | 25.8 |
| Saturates | 22.8 | 29.7 | 30.2 | 30.6 |
| Total | 100.0 | 100.0 | 100.0 | 99.9 |
| Sulfur, percent w | 4.05 | 1.23 | 0.76 | 0.80 |
| Nickel, p.p.m.w | 16 | 6 | ---------- | 4 |
| Vanadium, p.p.m.w | 49 | 17 | ---------- | 12 |

From the above data, it is obvious that, under the conditions applied, the catalyst according to the invention also converts bituminous oil components, namely, asphaltenes and resins. Of the fractions boiling above 375° C. the heavy-metal content has decreased considerably, and also the sulfur content has decreased by at least 70%.

EXAMPLE VII

In a pilot plant a long residue originating from a Caribbean crude oil was hydrodesulfurized over the catalyst of Example I. The catalyst was applied in the form of particles with a particle size of 0.4–1.0 mm. (35–18 mesh). The feed had a sulfur content of 2.1% w. and a metal content of 29 p.p.m.w. Ni and 205 p.p.m.w. V. After sulfiding of the catalyst, stable operation was reached after 400 kg. feed per kg. catalyst had passed over the catalyst bed at a pressure of 150 kg./cm.², a temperature of 420° C., a space velocity of 2.2 liters of feed per liter of catalyst per hour, and a hydrogen-gas feed rate of 500 Nl. per liter of feed. The sulfur content of the product obtained then had been reduced by more than 40% w.

We claim as our invention:

1. A hydrocracking process which comprises contacting a residual oil with hydrogen under hyrocracking conditions with a catalyst comprising a hydrogenation metal component on a porous silica-alumina support, said catalyst being prepared by the method which comprises:
   (a) calcining a silica-alumina cogel and then neutralizing the calcined support with a nitrogen base;
   (b) depositing a hydrogenation metal component on said neutralized support by contacting it with an alkaline solution containing a salt of said catalytically active metal component;
   (c) calcining said salt-containing neutralized support in an oxygen-containing gas at a temperature in the range of about 185–400° C., the oxygen content of said gas and calcining time being regulated to avoid sintering the hydrogenation metal component; and
   (d) finally calcining said salt-containing neutralized support in an oxygen-containing gas at a temperature in the range of about 475–650° C. for at least about 1 hour.

2. The process of claim 1 wherein said silica-alumina support contains from 40–95% wt. silica.

3. The process of claim 2 wherein the silica-alumina support is prepared as a cogel of aluminum hydroxide on a silica hydrogel.

4. The process of claim 1 wherein the nitrogen base used to neutralize the calcined support is ammonium hydroxide.

5. The process of claim 1 wherein said catalytically active metal component is selected from the group consisting of cobalt, nickel, molybdenum and tungsten.

6. The process of claim 5 wherein the catalytically active metals component includes both nickel and molybdenum and the nickel is applied to the support from an alkaline nickel formate solution.

7. The process of claim 1 wherein the salt-containing neutralized support of step (b) is first heated under a blanket of inert gas to a temperature which is 25 to 100° C. below the first calcination temperature of step (c), after which from 0.5 to 2.5% v. oxygen is added and the temperature is gradually increased to said first calcination temperature in the range of 185–400° C.

8. A hydrodesulfurization process which comprises contacting a residual oil with hydrogen under hydrodesulfurization conditions with a catalyst comprising a hydrogenation metal component on a porous silica-alumina support, said catalyst being prepared by the method which comprises:
   (a) calcining a silica-alumina cogel and then neutralizing the calcined support with a nitrogen base;
   (b) depositing a hydrogenation metal component on said neutralized support by contacting it with an alkaline solution containing a salt of said catalytically active metal component;
   (c) calcining said salt-containing neutralized support in an oxygen-containing gas at a temperature in the range of about 185–400° C., the oxygen content of said gas and calcining time being regulated to avoid sintering the hydrogenation metal component; and
   (d) finally calcining said salt-containing neutralized support in an oxygen-containing gas at a temperature in the range of 475–650° C. for at least about 1 hour.

9. The process of claim 8 wherein said silica-alumina support contains from 40–95% wt. silica and is prepared as a cogel of aluminum hydroxide on a silica hydrogel.

10. The process of claim 8 wherein the nitrogen base used to neutralize the calcined support is ammonium hydroxide and said catalytically active metal component is selected from the group consisting of cobalt, nickel, molybdenum and tungsten.

11. The process of claim 10 wherein the catalytically active metal component includes both nickel and molybdenum and the nickel is applied to the support from an alkaline nickel formate solution.

12. The process of claim 8 wherein the salt-containing neutralized support of step (b) is first heated under a blanket of inert gas to a temperature which is 25 to 100° C. below said first calcination temperature of step (c), after which from 0.5 to 2.5% v. oxygen is added and the temperature is gradually increased to said first calcination temperature in the range of 185–400° C.

13. The process of claim 8 wherein the hydrocarbon is an asphaltene-containing residual oil having a boiling range substantially above 350° C., and the silica-alumina supported catalyst includes 1–10 parts by weight of nickel and 5–30 parts by weight of molybdenum, said metals being in the sulfide form.

14. The process of claim 13 wherein the sulfur content of the residual oil is reduced by at least 50% at a temperature in the range from 300 to 500° C., a pressure in the range of from 35–350 kg./cm.², a space velocity of 0.2 to 10 parts by volume of oil per volume of catalyst per hour and a hydrogen/oil ratio of 150 to 5,000 Nl. per kilogram of feed.

References Cited

UNITED STATES PATENTS

| 3,285,860 | 11/1966 | Richardson | 208—216 |
| 3,471,399 | 10/1969 | O'Hara | 208—216 |
| 3,016,347 | 1/1962 | O'Hara | 208—216 |

DELBERT E. GANTZ, Primary Examiner

G. J. CRASANAKIS, Assistant Examiner

U.S. Cl. X.R.

208—216, 217